June 17, 1952 W. W. CROUCH ET AL 2,600,737
METHOD OF MAKING TERTIARY ALKYL TRITHIOCARBONATES
Filed Nov. 3, 1947
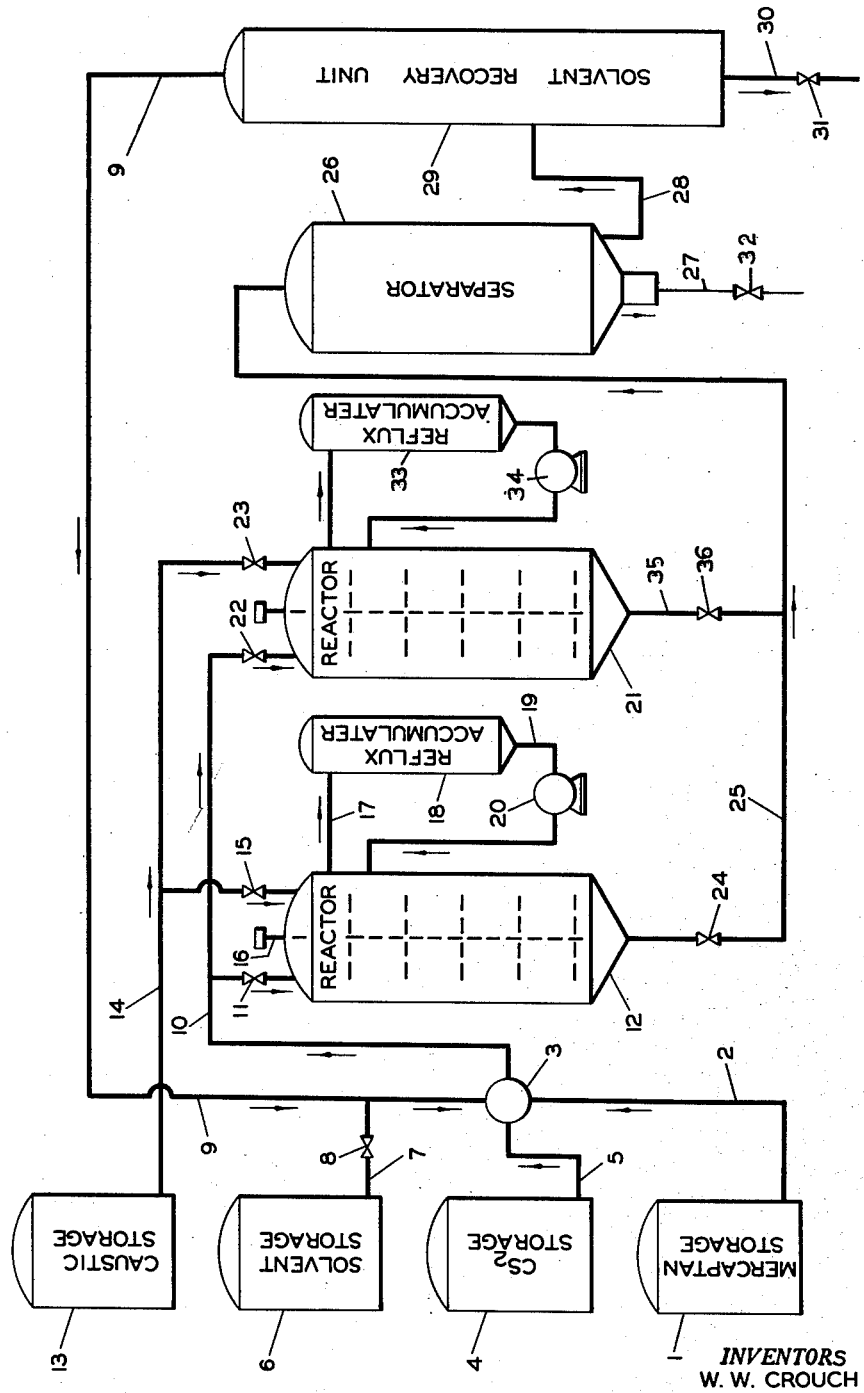
INVENTORS
W. W. CROUCH
T. F. CROSNOE
R. T. WERKMAN
BY
Hudson & Young
ATTORNEYS Patented June 17, 1952

2,600,737

UNITED STATES PATENT OFFICE 2,600,737

METHOD OF MAKING TERTIARY ALKYL TRITHIOCARBONATES

Willie W. Crouch, Ted F. Crosnoe, and Robert T. Werkman, Bartlesville, Okla., assignors to Phillips Petroleum Company, a corporation of Delaware Application November 3, 1947, Serial No. 783,830

10 Claims. (Cl. 260—455)

This invention relates to new chemical compounds, namely, tertiary alkyl trithiocarbonates wherein the tertiary alkyl group contains not to exceed ten carbon atoms, and to a method for their preparation. More specifically it relates to the preparation of tertiary alkyl trithiocarbonates in which the tertiary alkyl group contains not to exceed ten carbon atoms, from selected tertiary mercaptans, carbon disulfide, and an alkali metal hydroxide, and to a continuous process for their production wherein the reaction is effected in an organic solvent.

Tertiary alkyl trithiocarbonates have numerous potential uses, particularly as ore flotation agents and intermediates for the production of insecticides, therapeuticals, and other valuable organic compounds. However, in the past these compounds have not been prepared.

By analogy of the reaction of mercaptans with carbon disulfide and alkali metal hydroxide to produce trithiocarbonates with the reaction of alcohols with these materials to produce xanthates, with which it has been reported (C. A., 33, 8573 (1939)) that the rate of reaction decreases in the order primary alcohols>secondary alcohols>tertiary alcohols, it was anticipated that difficulties would be encountered in the reaction of the tertiary mercaptans. However, we have found that it is readily possible to prepare the trithiocarbonates from the low molecular weight ($C_4$ to $C_{10}$) tertiary alkyl mercaptans.

The principal object of the present invention is to make available to the art as new chemical compounds tertiary alkyl trithiocarbonates wherein the tertiary alkyl group contains not more than ten carbon atoms. Another object is to provide a method of synthesizing such tertiary alkyl trithiocarbonates. Another object is to effect the synthesis in such a manner that the product is more readily recovered from the reaction mixture without the necessity of recovering it from solution in water. Many other objects will more fully appear hereinafter.

We have now prepared tertiary alkyl trithiocarbonates having the formula

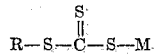

wherein R represents a tertiary alkyl group having not more than ten carbon atoms and M is an alkali metal atom. The novel compounds of our invention are prepared by the interaction of tertiary mercaptans corresponding in number of carbon atoms to the alkyl group of the desired trithiocarbonate, carbon disulfide, and an alkali metal hydroxide, the reaction being conducted in a medium comprising a low boiling organic solvent.

The reaction involved in the preparation of our tertiary alkyl trithiocarbonates proceeds according to the following equation:

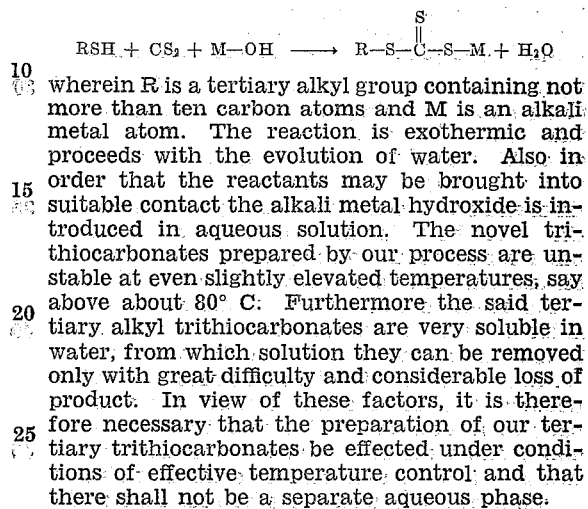

wherein R is a tertiary alkyl group containing not more than ten carbon atoms and M is an alkali metal atom. The reaction is exothermic and proceeds with the evolution of water. Also in order that the reactants may be brought into suitable contact the alkali metal hydroxide is introduced in aqueous solution. The novel trithiocarbonates prepared by our process are unstable at even slightly elevated temperatures, say above about 80° C. Furthermore the said tertiary alkyl trithiocarbonates are very soluble in water, from which solution they can be removed only with great difficulty and considerable loss of product. In view of these factors, it is therefore necessary that the preparation of our tertiary trithiocarbonates be effected under conditions of effective temperature control and that there shall not be a separate aqueous phase.

According to our invention the reaction may be effected in a low boiling organic solvent. The heat of reaction boils the solvent, the vapors of which are passed to a suitable reflux condenser and returned to the action vessel, thus providing an adequate temperature control. The reaction may also be carried out in a solvent which has a boiling point higher than the reaction temperature, in which case the necessary cooling is carried out in conventional type cooling coils or the like. According to our invention the alkali metal hydroxide is added in a highly concentrated aqueous solution, generally at least 40 per cent and preferably about 50 per cent. By thus maintaining the water content of the system at an extremely low level, the small quantity of water added together with the water evolved in the reaction is largely utilized as water of hydration in the crystalline tertiary alkyl trithiocarbonates, which upon analysis appear to contain at least two and in some instances three molecules of hydrate water per molecule. Thus the existence of a separate aqueous phase in the reaction zone is substantially prevented.

Other advantages of our process will be apparent from a description of the accompanying diagram in which is shown a flow sheet for one specific embodiment of the method of our invention. Referring to the drawing, a tertiary mercaptan from storage 1 is conveyed via line 2 to mixing chamber 3 where it is commingled with an equimolar quantity of carbon disulfide drawn from storage 4 through line 5 and solvent conveyed from storage 6 via line 7 containing valve 8, or from recycle line 9. The mixture is discharged through line 10 containing valve 11 to reactor 12 where it is admixed with a concentrated aqueous solution of an alkali metal hydroxide conveyed from storage 13 via line 14 containing valve 15. The addition of the alkali metal hydroxide is made slowly and the mixture is stirred constantly with mechanical agitator 16. As the reaction proceeds the heat evolved causes the solvent to boil and the vapors pass through line 17 to reflux accumulator 18 from which the condensate is returned to the reactor via line 19 containing pump 20. The tertiary alkyl trithiocarbonate is produced almost instantaneously in substantially quantitative yield and forms a slurry with the solvent.

When the reactor is filled the feed streams are diverted to reactor 21 by closing valves 11 and 15 and opening valves 22 and 23. The contents of reactor 12 is stirred for a short time up to several hours, but usually for not more than about 90 minutes, until reaction is completed. Valve 24 in line 25 is then opened and the slurry of tertiary alkyl trithiocarbonate in solvent conveyed to separator 26 which may be a stationary filtration system or a centrifugal separator. The crystalline product is discharged through line 27 by opening valve 32 and the solvent passed through line 28 to solvent recovery unit 29. From this unit the reclaimed solvent is removed via line 9 for recycling to the process and impurities discharged via line 30 containing valve 31.

The reaction and procedure carried out in reactor 21 with reflux accumulator 33 and pump 34 is similar to that described above for reactor 12, reflux accumulator 18, and pump 20. When reactor 21 is full, the feed streams are diverted back to reactor 12 by closing valves 22 and 23 and opening valves 11 and 15. The reaction in reactor 21 is then effected in a manner similar to the above-described procedure for reactor 12, and the resulting slurry is subsequently conveyed to separator 26 through line 35, valve 36, and line 25.

The ratio of reactants employed is generally 1 mol of caustic with 0.85 to 1.0 mol of tertiary mercaptan and with 1.0 to 2.0 mols of carbon disulfide. Any unreacted carbon disulfide may be reclaimed in the solvent recovery unit and recycled to the reaction with the recovered solvent.

The solvents employed in our process comprise organic liquids that are chemically inert with respect to the reactants and have mutual solubility for the tertiary mercaptans and carbon disulfide employed but substantially none for the trithiocarbonate. Preferably, they should have at least a limited solubility for water. In the practice of our invention we have preferred to employ diisopropyl ether as a solvent medium, although in some instances diethyl ether, aromatic hydrocarbons, or low boiling petroleum naphthas may be used by allowing a longer reaction time, say about three to six hours. In some instances it may be convenient to employ an excess of carbon disulfide as the reaction medium, thus eliminating the use of an extraneous solvent.

The general procedure of synthesis in accordance with the present invention comprises first forming a solution of the tertiary alkyl $C_4$ to $C_{10}$ mercaptan and carbon disulfide in the solvent, adding thereto a concentrated aqueous solution of the alkali metal hydroxide slowly with vigorous agitation, the rate of addition being such that a separate aqueous phase is prevented from forming to any substantial extent, and holding at a temperature of from 25 to 65° C., and preferably from 30 to 50° C., for a time sufficient to substantially complete the reaction. The trithiocarbonate forms as a crystalline precipitate and is recovered from the reaction mixture in any suitable manner, for example by filtration or centrifugation after which it may be purified in any suitable manner as by recrystallization.

The preferred method of operation employs a 5 per cent solution of the tertiary mercaptan in diisopropyl ether to which there is added a 50–100 per cent molar excess of carbon disulfide. The solution is stirred vigorously under a reflux condenser while adding dropwise approximately one molar equivalent of sodium hydroxide as a 50 per cent aqueous solution. The caustic reacts instantly with the mercaptan to form a finely divided white precipitate of sodium mercaptide which then reacts more slowly with the carbon disulfide to produce the yellow crystalline trithiocarbonate. The temperature is maintained at 35–45° C. during the caustic addition. The reaction mixture is stirred for 2 to 3 hours after all the caustic has been added. Upon completion of the reaction, the product is recovered in a centrifugal filter or other suitable separating means. The water introduced with the caustic and that produced in the reaction remains in the trithiocarbonate crystals as water of hydration. The reaction is substantially quantitative.

All attempts to employ a tertiary alkyl mercaptan having more than ten carbon atoms per molecule in the process described herein have been entirely unsuccessful, and accordingly use of such higher than $C_{10}$ mercaptans is without the scope of the present invention.

The products of the present invention are water-soluble, yellow crystalline solids which retain two molecules of water of hydration even after very thorough drying.

Sodium hydroxide is preferred as the alkali metal hydroxide on the grounds of cheapness and availability. However, hydroxides of any other alkali metal such as potassium and lithium may be used.

In an alternative embodiment of our process, solvents such as acetone, diethyl ether, aromatic hydrocarbons such as benzene or toluene, and petroleum naphthas are employed, the reaction being carried out at a temperature of about 25–65° C. with pressures sufficiently high that boiling of the carbon disulfide does not occur, say about 25 pounds per square inch gauge or above. When operating in this manner, cooling of the system is effected by coils or other suitable means.

The quantity of solvent employed should be sufficient to provide a solution wherein the reactants comprise about 10 to 20 per cent of the total. When employing an excess of carbon disulfide in lieu of an extraneous solvent the amount employed above that required for the reaction will be in the same order.

*Example I*

A mixture comprising 10 grams of 79 per cent pure tertiary hexyl mercaptan, 7 grams of carbon disulfide, and 200 cc. of diethyl ether was placed in a flask equipped with a reflux condenser and a mechanical stirrer. To this mixture was added 2.7 grams of sodium hydroxide in a 50 per cent aqueous solution, the addition being made dropwise with efficient stirring. The temperature of the mixture mounted rapidly until the ether boiled. Crystalline tertiary hexyl trithiocarbonate separated as the reaction proceeded, forming a slurry with the ether solvent. After addition of the carbon disulfide was complete the temerature was held at the boiling point of ether for 30 minutes, after which the mixture was filtered to provide 16 grams of crystalline tertiary hexyl trithiocarbonate dihydrate which was 95 per cent of theoretical. The product is in the form of yellow crystals having a strong mercaptan odor and decomposing at 104 to 108° C. to leave a dark orange solid residue.

Example II

A reaction mixture was prepared comprising 30 grams of tertiary butyl mercaptan in 250 cc. of carbon disulfide, the excess carbon disulfide being added to serve as a reaction medium for the reaction. The system was placed under pressure to maintain a temperature of 50° C. as 13 grams of sodium hydroxide in 50 per cent aqueous solution was added in a dropwise manner, the reactants being stirred constantly during the addition. The reaction mixture was maintained at a temperature of 50° C. for a period of five hours after which the crystalline tertiary butyl trithiocarbonate was removed by filtration. The yield of tertiary butyl trithiocarbonate dihydrate was 70 grams, which was 96 per cent of theoretical. The product decomposed at 127 to 129° C. to leave a dark orange residue.

Example III

The experiment of Example I was repeated employing 22 grams of tertiary octyl mercaptan, 11.5 grams of carbon disulfide, 250 cc. diethyl ether, and six grams of sodium hydroxide in 50 per cent aqueous solution. A yield of 42 grams of crystalline tertiary octyl trithiocarbonate trihydrate was obtained. Decomposition point of the product was 112–116° C.

Example IV

Equimolar quantities of tertiary butyl mercaptan and carbon disulfide were mixed with diethyl ether in a manner such that the mixed reactants made up about 15 per cent of the total. This mixture was charged into a stirred reactor such as shown in the accompanying flow sheet, into which a 50 per cent aqueous solution was added at a rate sufficient that the heat of the resulting reaction maintained an even ebullition of the ether solvent. The addition of sodium hydroxide was halted when the calculated amount had been added and the reaction mixture was maintained at the temperature of boiling ether for an additional 30 minutes. The contents were then discharged to a filter where crystalline tertiary butyl trithiocarbonate was separated and the solvent returned to the process.

Example V

A reaction mixture consisting of 18 grams of tertiary butyl mercaptan and 28 grams of carbon disulfide (85 per cent excess above that required to react with the mercaptan) was charged to a flask together with 200 grams of diisopropyl ether. To this mixture 8 grams of sodium hydroxide (in 50 per cent aqueous solution) was added dropwise with stirring and a reaction temperature of approximately 38° C. was maintained. The reaction was complete after 4 hours additional stirring at the above temperature. The pure sodium tertiary butyl trithiocarbonate was separated by filtration.

*Sodium content:*

Calculated for $C_4H_9SCS_2Na.2H_2O = 10.26$
Found = 10.1

Example VI

The experiment of Example V was repeated employing 18 grams of tertiary butyl mercaptan, 30 grams of carbon disulfide (97.4 per cent excess), 8 grams of sodium hydroxide in 50 per cent solution and 200 grams of diisopropyl ether. This run was carried out at a temperature of 50° C. and the reaction was found to be complete in 1.5 hours after caustic addition. The product was a yellow crystalline solid which contained 10.3 per cent sodium. (The sodium content was determined by decomposing the product with sulfuric acid, igniting, and weighing the residual sodium sulfate).

Example VII

An experiment similar to that of Experiment V was carried out in which 23.6 grams of tertiary hexyl mercaptan, 30 grams of carbon disulfide, 8.4 grams of sodium hydroxide (in 50 per cent solution) and 200 grams of diisopropyl ether were employed. After the caustic had been added dropwise the reaction mixture was stirred for an additional 1.5 hours while maintaining a temperature of 45–50° C. The product, a yellow crystalline powder, was recovered by filtration and had a sodium content of 10.1 per cent. The diisopropyl ether solvent was recovered and found to contain 7.0 weight per cent carbon disulfide.

Example VIII

A run similar to that of Example V was carried out in which 18 grams of tertiary butyl mercaptan, 16 grams of carbon disulfide, 8.2 grams of sodium hydroxide (50 per cent solution) and 300 milliliters of normal heptane were employed. During the gradual addition of the caustic with stirring, the temperature increased from room temperature to between 32 and 38° C. Stirring was continued for one hour following the caustic addition. The product was a yellow crystalline solid, which, on analysis, was found to contain 14 per cent sodium.

Example IX

This reaction was the same as Example VIII except that 300 milliliters of dibutyl ether were employed as the solvent. The reaction mixture was stirred for one hour after the caustic addition and a yellow crystalline product was separated. The sodium content of the dried salt was found to be 11.95 per cent.

Example X

An experiment was carried out in which 18 grams of tertiary butyl mercaptan, 30 grams of carbon disulfide, 8.2 grams of sodium hydroxide (in 50 per cent solution) and 300 milliliters of toluene were employed. The reaction mixture was stirred for 3 hours after the addition of the caustic while the temperature was maintained at about 45° C. The product which was recovered was a yellow crystalline solid with a sodium content of 13.6 per cent.

Although the examples are drawn specifically to butyl, hexyl and octyl mercaptans, other tertiary alkyl mercaptans of 10 or less carbon atoms, such as amyl, heptyl, nonyl and decyl mercaptans, may be employed for the preparation of the corresponding tertiary alkyl trithiocarbonates. Likewise, various changes may be made in the process without departing from the spirit of the invention and it is intended that the claims cover all inherent modifications of the invention.

We claim:

1. The method of making a tertiary alkyl trithiocarbonate having the formula $$R-S-\underset{\underset{S}{\|}}{C}-S-M$$

where R is a tertiary alkyl group having not more than 10 carbon atoms and M is an alkali metal, which comprises forming a solution of a tertiary alkyl mercaptan having not more than 10 carbon atoms per molecule and carbon disulfide in low boiling dialkyl ether, adding thereto slowly and with vigorous agitation a concentrated aqueous solution of an alkali metal hydroxide, maintaining the resulting reaction mixture at a temperature of from 25–65° C. until substantial completion of the reaction with formation of a precipitate of said tertiary alkyl trithiocarbonate, and recovering said tertiary alkyl trithiocarbonate from the resulting reaction mixture.

2. The method of claim 1 wherein said solvent has a boiling point of at least 25° C. but less than 65° C. and wherein the reaction mixture is maintained under conditions such that said solvent is refluxed.

3. The method of claim 1 wherein said solvent is diisopropyl ether.

4. The method of claim 1 in which said solvent is diethyl ether.

5. The method of making a tertiary alkyl trithiocarbonate having the general formula $$R-S-\underset{\underset{S}{\|}}{C}-S-M$$

where R is a tertiary alkyl group having not more than 10 carbon atoms and M is an alkali metal, which comprises forming a solution of a tertiary alkyl mercaptan having not more than 10 carbon atoms per molecule and carbon disulfide in a low boiling dialkyl ether, adding thereto slowly and with vigorous agitation a solution of an alkali metal hydroxide of at least 40% concentration, maintaining the resulting reaction mixture at a temperature in the range of 25 to 65° C. for a period of time in the range of 90 minutes to 6 hours and until completion of the reaction with formation of a precipitate of said tertiary alkyl trithiocarbonate, and recovering said tertiary alkyl trithiocarbonate from the resulting reaction mixture.

6. The method of making a tertiary alkyl trithiocarbonate having the general formula $$R-S-\underset{\underset{S}{\|}}{C}-S-M$$

where R is a tertiary alkyl group having not more than 10 carbon atoms and M is an alkali metal, which comprises forming a solution of a tertiary alkyl mercaptan having not more than 10 carbon atoms per molecule and carbon disulfide in an organic solvent boiling in the range of 25 to 65° C. consisting of dialkyl ether, adding thereto slowly and with vigorous agitation a solution of an alkali metal hydroxide of at least 50 per cent concentration, maintaining the resulting reaction mixture at a temperature in the range of 25 to 65° C. for a period of time in the range of 90 minutes to 6 hours and until completion of the reaction with the formation of a precipitate of said tertiary alkyl trithiocarbonate, and recovering said tertiary alkyl trithiocarbonate, and recovering said tertiary alkyl trithiocarbonate from the resulting reaction mixture.

7. The method of making a tertiary alkyl trithiocarbonate having the general formula $$R-S-\underset{\underset{S}{\|}}{C}-S-M$$

where R is a tertiary alkyl group having not more than 10 carbon atoms and M is an alkali metal, which comprises forming a solution of tertiary alkyl mercaptan having not more than 10 carbon atoms per molecule in a low boiling dialkyl ether, introducing to said solution an excess of carbon disulfide based on the dissolved tertiary mercaptan, adding thereto slowly and with vigorous agitation a solution of an alkali metal hydroxide of at least 50 per cent concentration, maintaining the resulting reaction mixture at a temperature in the range of 30 to 50° C. for a period of time in the range of 90 minutes to 6 hours and until completion of the reaction with formation of a precipitate of said tertiary alkyl trithiocarbonate, and separating and recovering said tertiary alkyl trithiocarbonate from the resulting reaction mixture.

8. The method of making a tertiary alkyl trithiocarbonate having the general formula $$R-S-\underset{\underset{S}{\|}}{C}-S-M$$

where R is a tertiary alkyl group having not more than 10 carbon atoms and M is an alkali metal, which comprises forming a 5 volume per cent solution of a tertiary alkyl mercaptan having not more than 10 carbon atoms per molecule in low boiling dialkyl ether, introducing to said solution a 50 to 100 per cent molar excess of carbon disulfide based on said mercaptan, adding thereto slowly and with vigorous agitation a molar equivalent based on said mercaptan of an alkali metal hydroxide in an aqueous solution of at least 50 per cent concentration, maintaining the resulting reaction mixture at a temperature in the range of 35 to 45° C. and under conditions such that said solvent is refluxed for a period of time in the range of 2 to 3 hours and until completion of the reaction with formation of a precipitate of said tertiary alkyl trithiocarbonate, and separating and recovering said tertiary alkyl trithiocarbonate from the resulting reaction mixture.

9. The method of making a tertiary alkyl trithiocarbonate having the general formula $$R-S-\underset{\underset{S}{\|}}{C}-S-M$$

where R is a tertiary alkyl group having not more than 10 carbon atoms and M is an alkali metal, which comprises forming a 5 volume per cent solution of tertiary butyl mercaptan in diisopropyl ether, introducing to said solution a 50 to 100 per cent molar excess of carbon disulfide based on said mercaptan, adding thereto slowly and with vigorous agitation a molar equivalent of an alkali metal hydroxide in an aqueous solution of at least 50 per cent concentration based on said mercaptan, maintaining the resulting reaction mixture at a temperature in the range of 35 to 45° C. for a period of time in the range of 2 to 3 hours and until completion of the reaction with formation of a precipitate of said tertiary butyl trithiocarbonate, and separating and recovering said tertiary butyl trithiocarbonate from the resulting reaction mixture.

10. The method of making a tertiary alkyl trithiocarbonate having the general formula $$R-S-\underset{\underset{\parallel}{S}}{C}-S-M$$

where R is a tertiary alkyl group having not more than 10 carbon atoms and M is an alkali metal, which comprises forming a solution of a tertiary alkyl mercaptan of not more than 10 carbon atoms per molecule and carbon disulfide in a low-boiling dialkyl ether, adding thereto slowly and with vigorous agitation a solution of an alkali metal hydroxide of at least 40 per cent concentration and thereby forming the corresponding alkali metal mercaptide, maintaining the resulting reaction mixture at a temperature in the range of 25 to 65° C. and vigorously agitated until said carbon disulfide has reacted with said alkali metal mercaptide to form a precipitate of the corresponding tertiary alkyl trithiocarbonate, and separating and recovering said tertiary alkyl trithiocarbonate from the resulting reaction mixture.

WILLIE W. CROUCH.
TED F. CROSNOE.
ROBERT T. WERKMAN.

REFERENCES CITED

The following references are of record in the file of this patent:

UNITED STATES PATENTS

| Number | Name | Date |
|---|---|---|
| 2,021,726 | Hess | Nov. 19, 1935 |
| 2,024,924 | Hirschkind et al. | Dec. 17, 1935 |
| 2,152,461 | Bishop | Mar. 28, 1939 |
| 2,197,964 | Bishop | Apr. 23, 1940 |
| 2,203,739 | Ott | June 11, 1940 |
| 2,396,487 | Blake | Mar. 12, 1946 |
| 2,445,142 | Himel | July 13, 1948 |
| 2,458,075 | Himel | Jan. 4, 1949 |
| 2,498,863 | Badertscher et al. | Feb. 28, 1950 |
| 2,498,936 | Badertscher et al. | Feb. 28, 1950 |

OTHER REFERENCES

Houben: "Die Methoden der Org. Chemie," vol. 3 (3rd ed. 1930), page 587.